Patented June 9, 1942

2,285,562

UNITED STATES PATENT OFFICE 2,285,562

STYRENE COPOLYMER COMPOSITION

Edgar C. Britton, Gerald H. Coleman, and John W. Zemba, Midland, Mich., assignors to The Dow Chemical Company, Midland, Mich., a corporation of Michigan No Drawing. Application July 29, 1939, Serial No. 287,406

6 Claims. (Cl. 260—36)

This invention relates to new synthetic resin plastic compositions and in particular to elastic and extensible compositions comprising certain plasticized co-polymers of styrene.

In the co-pending applications of Britton et al., Serial No. 191,958, filed February 23, 1938, now U. S. Patent No. 2,186,359; Serial No. 191,959, filed February 23, 1938; Serial No. 191,960, filed February 23, 1938, now U. S. Patent No. 2,186,360; Serial No. 199,892, filed April 4, 1938; and Serial No. 213,022, filed June 10, 1938 are described co-polymeric products prepared by polymerizing styrene in the presence of certain unsaturated esters containing at least two olefinic linkages, e. g. the unsaturated esters of 1.4-dioxanediol-2.3, such as the di-cinnamate of 1.4-dioxanediol-2.3, the di-crotonate of dioxanediol-2.3, etc.; the allyl-type esters of phosphoric acid, such as tri-methallyl phosphate, triallyl phosphate, etc.; allyl esters of polycarboxylic acids, such as diallyl phthalate, diallyl succinate, diallyl maleate, etc.; unsaturated esters of 2-choroallyl alcohol, such as di-(2-chloroallyl) oxalate, 2-chloroallyl cinnamate, 2-chloroallyl furoate, di-(2-chloroallyl) adipate, etc.; and allyltype esters of unsaturated mono-carboxylic acids, such as allyl methacrylate, allyl cinnamate, cinnamyl cinnamate, etc. These products are usually obtained as glass-like thermoplastic resins, although in some cases they may be obtained as opaque white friable materials which, however, are capable of being molded to form glass-like products. The polymers initially obtained as transparent resins may be soluble in the usual solvents for polystyrene, e. g. carbon tetrachloride, benzene, toluene, ethylbenzene, etc., or they may be capable only of swelling to form insoluble gels when contacted with such solvents. The opaque white type of co-polymer is substantially insoluble and non-swelling. All of such co-polymers are characterized by stability towards discoloration by light and heat, good dielectric properties, high mechanical strength and heat stability, impermeability to moisture, and resistance to attack by acids and alkalies.

We have now found that the styrene co-polymers of the type capable of being swelled by solvents have the unusual property of forming tough, elastic, rubber-like compositions when admixed with a relatively large proportion of a plasticizing agent. Such compositions retain many of the desirable properties of the unplasticized co-polymers and in addition possess exceptional elasticity and extensibility. They are useful in the manufacture of extruded wire coatings, as textile impregnants, and as addition agents for cellulose derivative and other synthetic resin plastic compositions. They may also be loaded with suitable fillers, pigments, addition agents, etc., and molded into shaped objects.

We are aware that it is known (U. S. Patent No. 2,155,590) to prepare plastic compositions having rubber-like characteristics by polymerizing a mixture of a solid polymeric material, such as polyvinyl acetate, cellulose acetate, polyacrylic esters, etc., and a polymerizable plasticizing agent. The products so prepared, however, differ from those of the present invention in that they are mechanically interlocked mixtures of polymers rather than plasticized co-polymers.

The plasticizing agents which may be employed in preparing the new compositions are preferably high-boiling liquids, although amorphous or crystalline solids may be used. The latter materials, however, should be sufficiently compatible with the styrene co-polymers that they do not crystallize or exude from the compositions upon standing. Among the particular types of plasticizing agents which we have found to be most suitable are aromatic diethers, such as 1.2-diphenoxy-ethane, 1.3-di-(4-tertiarybutylphenoxy)-isobutane, 1-phenoxy-3-(4-chlorophenoxy)-propane, etc.; unsaturated aryloxy-alkyl esters, such as beta-phenoxy-ethyl crotonate, gamma-(4-tertiarybutylphenoxy)-propyl furoate, beta-(2-xenoxy)-ethyl crotonate, etc.; aromatic substituted aliphatic hydrocarbons, and their halogenated derivatives, such as dixylyl ethane, 1.2-di-(3.4-di-chlorophenyl)-propane, 1.2-di-(4-xenyl)-ethane, 1.4-di-(2-methylphenyl)-butane, etc.; diaryl ether derivatives, such as chlorinated diphenyloxide, cyclohexyl-diphenyloxide, cyclohexyl-dinaphthyl ether, di-ethyl-diphenloxide, cyclohexyl-chloro-diphenyloxide, etc.; esters of polycarboxylic acids, such as dibenzyl maleate, dibutyl phthalate, dicyclohexyl adipate, etc.; aryloxy-alkyl chlorides, such as beta-phenoxy-ethyl chloride, beta-tertiarybutylphenoxy-propyl bromide, etc.; ethers and esters of hydroxy-diphenyl derivatives, such as 4-xenyl ethyl ether, 2-chloro-5-tertiarybutyl-(4-xenyl)-crotonate, 2-xenyl levulinate, 3-xenyl-hexyl ether, etc. It is to be understood, however, that the types of plasticizing agents just mentioned merely represent a preferred group, and that any of the materials commonly known as "plasticizing agents" may be employed. Among such materials may be mentioned neutral esters of phosphoric acid, such as tricresyl phosphate, tri-p-tertiarybutylphenyl phosphate, di-xenyl-mono-phenyl phosphate, etc.; aromatic hydrocarbons, such as alkylated naphthalenes and diphenyls, phenanthrene, etc., esters, such as glycerine triacetate, dibutyl tartrate, glycol di-p-tertiarybutylphenoxy acetate, benzyl benzoate, triamyl citrate, butyl phthallyl butyl glycollate, etc.

The new plastic compositions are conveniently prepared directly by polymerizing a mixture of monomeric styrene, an unsaturated ester co-polymerizing agent, and a plasticizing agent. The plasticizing agent is employed in a proportion sufficient to impart the desired degree of elasticity and extensibility to the co-polymer, although the exact amount required to effect a given degree of elasticity and extensibility varies somewhat with the particular plasticizing agent and co-polymer employed. In general, however, we have found that products of greatest utility are obtained when the plasticizing agent is employed in an amount representing at least about 50 per cent, and preferably from about 50 to about 200 per cent, by weight of the co-polymer. The co-polymerizing agent is usually employed in an amount representing from about 0.1 to about 15 per cent by weight of the styrene, although the optimum amount depends somewhat upon the particular co-polymerizing agent and the properties desired in the composition. The polymerization is usually carried out by heating the mixture of styrene, co-polymerizing agent, and plasticizing agent in the presence or absence of polymerization catalysts, such as benzoyl peroxide, etc., at a moderately elevated temperature, e. g. 60°–180° C., for approximately 3–14 days, during which time the mixture gradually polymerizes to form a tough, rubber-like mass. A large amount of heat is developed during the polymerization, and when operating an a large scale it is advantageous to provide heat-dissipating means in order to maintain the desired temperature. If desired, the polymerization may be initiated at a relatively low temperature, e. g., 60° C., and the temperature gradually increased as the polymerization proceeds.

Although the products prepared in this manner are suitable for use directly as wire coatings, addition agents, impregnants, etc., we prefer to subject these to a working or milling operation on hot compounding rolls for a short time to insure a completely homogeneous composition and to vaporize off unpolymerized styrene.

The new compositions may also be prepared by forming the co-polymer in the absence of the plasticizing agent, i. e. by polymerizing a mixture of monomeric styrene and an unsaturated ester co-polymerizing agent in such a manner that the co-polymer formed is of the swelling type, and thereafter causing the co-polymer to swell to a gel in a solution of the plasticizing agent in a swelling solvent, e. g. benzene, toluene, carbon tetrachloride, etc. During the swelling operation, the plasticizing agent is dispersed into the co-polymer gel, and, after removal of the solvent, the plasticized composition is obtained in the form of a homogeneous rubber-like mass. This method of incorporating a plasticizing agent with a styrene co-polymer forms the subject-matter of the co-pending application of Britton and Marshall, Serial No. 209,736, filed May 24, 1938.

A third method which may be employed in preparing the new compositions comprises mechanically mixing the finely divided co-polymer with the plasticizing agent, with or without the aid of solvents, addition agents, etc., in a Banbury-type mixer or on heated compounding rolls until a homogeneous composition is obtained.

The following examples illustrate several ways in which the principle of the invention has been applied but are not to be construed as limiting the same.

*Example 1*

A sample of the clear, transparent, swelling type of co-polymer prepared by the conjoint polymerization of styrene and 4 per cent by weight thereof of trimethallyl phosphate was mixed with an equal amount of beta-(4-tertiarybutylphenoxy)-ethyl crotonate. The mixing was effected by milling on hot compound rolls at a temperature of 140° C. for 15 minutes. When cool, the composition so prepared was a tough rubber-like mass having an elasticity value of 80 per cent as determined by the Shore elastometer. Similar compositions comprising this co-polymer and the plasticizing agent, dibenzyl maleate and 1.3-di-phenoxy-isobutane had elasticity values of 77 per cent and 80 per cent, respectively.

*Example 2*

A mixture of 100 parts of monomeric styrene and 0.5 part of the dicinnamate of 1.4-dioxanediol-2.3 was polymerized to form a hard, clear, glass-like resin which was insoluble but capable of being swelled in benzene and similar aromatic solvents. Equal parts of this product and dibenzyl maleate were mixed on hot compounding rolls at a temperature of 140° C. for 30 minutes. The composition so obtained was a tough plastic mass having an elasticity value of 85 per cent. A similar composition plasticized with meta-(4-tertiarybutyl-phenoxy)-ethyl crotonate had an elasticity value of 81 per cent.

*Example 3*

A mixture of 250 parts of monomeric styrene, 1.25 parts of the dicinnamate of 1.4-dioxanediol-2.3, and 125 parts of a mixture of isomeric mono-amyl-diphenyloxides was polymerized by heating at a temperature of 100° C. for 336 hours. The product obtained was a soft, clear, rubbery solid having an elasticity value of 85 per cent.

*Example 4*

A mixture of 25 parts of monomeric styrene, 1 part of diallyl maleate, and 12.5 parts of beta-(2-methylphenoxy)-ethyl furoate was polymerized by heating at a temperature of 100° C. for 168 hours. The plasticized co-polymer was then milled on compounding rolls at a temperature of 140° C. for 15 minutes to remove any unpolymerized styrene. The composition so prepared was a soft, rubber-like solid having good elasticity and extensibility. Similar compositions were prepared from the trimethallyl phosphate, dicinnamate of 1.4-dioxanediol-2.3, di-(2-chloroallyl) adipate, ethylene dicinnamate, allyl cinnamate, and diallyl maleate co-polymers of styrene and the plasticizing agents, 1.2-di-(3.4-di-chlorophenyl)-propane, 1.2-di-(4-chlorophenyl)-ethane, tertiary-amyl-diphenyloxide, beta-(2-xenoxy)-ethyl crotonate, 3-butoxy-diphenyl, di-(beta-chloro-beta'-(2-chloro-4-tertiarybutylphenyl)-ethyl) ether, phenoxy-propylene oxide, 1.2-di-(4-chlorophenyl)-propane, beta-(2-xenoxy)-ethyl crotonate, beta-(beta-(2-xenoxy)-ethoxy)-ethyl chloride, 5-tertiarybutyl-2-xenyl ethyl ether, di-beta-(2-xenoxy)-beta'-phenoxyethyl) ether, and di-(beta, beta'-di-(m, p-tolyoxy)-ethyl ether.

Example 5

The 4 per cent trimethallyl phosphate co-polymer of styrene described in Example 1 was mixed with dibenzyl maleate, sulfur, carbon black, and talc by milling on compounding rolls at a temperature of about 100° C. for 40 minutes. The ingredients were employed in the following proportions:

| | Parts |
|---|---|
| Co-polymer | 30 |
| Dibenzyl maleate | 27 |
| Talc | 25 |
| Carbon black | 12.5 |
| Sulfur | 1 |

The product obtained was a tough, black, elastic material resembling unvulcanized rubber and having an elasticity value of 64 per cent. A similar composition having 71 per cent elasticity was prepared employing beta-(4-tertiarybutylphenoxy)-ethyl crotonate as the plasticizing agent.

Example 6

Monomeric styrene and diallyl maleate were co-polymerized by heating at 100° C. to obtain a co-polymer of the opaque, white, insoluble and non-swelling type. A mixture of 1 part of this product, 200 parts of monomeric styrene, and 100 parts of 1.2-di-(4-chlorophenyl)-ethane was polymerized by heating at a temperature of 80° C. for 168 hours. The polymerizate was then milled for 15 minutes at 165° C. A molded specimen milled product was a soft, elastic solid, having a tensile strength of 582 pounds per square inch, a stretch value of 111 per cent, and an elongation value of 387 per cent.

Example 7

A mixture of 200 parts by weight of monomeric styrene and 1 part of the di-cinnamate of 1.4-dioxanediol-2.3 was polymerized by heating at 100° C. for 5 days whereby there was obtained a clear, resinous co-polymer of the insoluble, swelling type. Approximately 25 parts of this product was added in finely-divided form to 250 parts of a 4 per cent benzene solution of 3-n-butoxy-diphenyl. The mixture was allowed to stand for several hours whereby the co-polymer swelled to a firm gel, after which time the benzene was evaporated off and the mixture was dried on a steam bath. The plasticized composition was a tough, flexible solid. A more elastic composition may be prepared employing a larger proportion of plasticizing agent.

In the following claims the term "solvent-swellable co-polymer of styrene" refers to the styrene co-polymers of the type which is substantially insoluble in the well-known solvents for polystyrene but is capable of swelling to a gel when contacted with such solvents. Similarly, the term "compatible plasticizing agent" refers to any one or a combination of those materials commonly known as plasticizing agents which does not crystallize or exude to the surface of the co-polymer composition when employed in a proportion sufficient to impart to the co-polymer the desired degree of elasticity and extensibility.

This application is a continuation-in-part of our co-pending application, Serial No. 209,737, filed May 24, 1938.

Other modes of applying the principle of our invention may be employed instead of those explained, change being made as regards the method herein disclosed or the materials employed, provided the method stated by any of the following claims be employed or the products claimed in any of the following claims be obtained.

We therefore particularly point out and distinctly claim as our invention:

1. An elastic extensible plastic composition comprising a solvent-swellable co-polymer of styrene and an unsaturated ester containing at least two olefinic linkages, and at least about 50 per cent by weight thereof of a compatible plasticizing agent.

2. An elastic extensible plastic composition comprising a solvent-swellable co-polymer of styrene and an unsaturated ester containing at least two olefinic linkages, and from about 50 to about 200 per cent by weight thereof of a compatible plasticizing agent.

3. An elastic extensible plastic composition comprising a solvent-swellable co-polymer of styrene and an unsaturated ester containing at least two olefinic linkages, and from about 50 to about 200 per cent by weight thereof of a compatible high-boiling liquid plasticizing agent.

4. An elastic extensible plastic composition comprising a solvent-swellable co-polymer of styrene and an unsaturated di-ester of 1.4-dioxanediol-2.3 containing at least two olefinic linkages, and from about 50 to about 200 per cent by weight thereof of a compatible plasticizing agent.

5. An elastic extensible plastic composition comprising a solvent-swellable co-polymer of styrene and an allyl-type ester of phosphoric acid containing at least two olefinic linkages, and from about 50 to about 200 per cent by weight of a compatible plasticizing agent.

6. An elastic extensible plastic composition comprising a solvent-swellable co-polymer of styrene and an allyl ester of a carboxylic acid containing at least two olefinic linkages, and from about 50 to about 200 per cent by weight thereof of a compatible plasticizing agent.

EDGAR C. BRITTON.
GERALD H. COLEMAN.
JOHN W. ZEMBA.